Sept. 19, 1961 J. W. BECK 3,001,140

DATA TRANSMISSION

Filed Nov. 29, 1957

INVENTOR.
JOHN W. BECK

BY Edward A. Robinson

ATTORNEY

United States Patent Office 3,001,140

Patented Sept. 19, 1961

3,001,140

DATA TRANSMISSION

John W. Beck, San Jose, Calif., assignor to International Business Machines Corporation, New York, N.Y., a corporation of New York Filed Nov. 29, 1957, Ser. No. 699,795

2 Claims. (Cl. 328—135)

This invention relates to computers and data processing machines, and more particularly to such machines utilizing magnetic storage devices wherein the digital data must appear in specific waveforms for recording on or reading from the magnetic device.

An electronic computer or data processing machine requires memory files for storing digital information for future reference. One such memory device uses magnetic cores arranged in a matrix with electrical conductors linking the cores. Such a device may be termed as a "high speed store" since it is capable of functioning as rapidly as the other electronic components associated therewith in the computer circuit. Other types of magnetic storage devices may include a recording surface of magnetic material on a tape, disc or drum which is caused to move past a transducer for recording data on and reading data from the surface. Such a device is not capable of the rapid access and high speed of the core matrix, but it does enjoy the advantage of a greater capacity for permanent and semi-permanent records.

The digital information passed by the computer circuits is conventionally a series of voltage pulses which are timed or synchronized with a "clock source." Thus, a signal representative of a binary "1" may be a voltage of a particular level, and a signal representative of a binary "0" may be a voltage of a different level. To record on a magnetic device, a pulse of current is required, and therefore it is desirable in some instances to have an abrupt change in voltage from a first level to a second level which will result in a short duration current flow and the establishment of a current pulse.

It is an object of this invention to provide an improved and simplified circuit for receiving digital information in the form of voltage levels and for transmitting the same digital information in the form of changes in voltage levels.

A further object of this invention is to provide a "flip-flop," or bistable multivibrator circuit, for producing an output voltage which will change from one level to another level at regular clock intervals—the direction or sense of the voltage change being indicative of the binary information thereby transmitted.

Briefly stated, according to this invention a flip-flop, or bistable multivibrator is used to produce output voltages, and is caused to change in its conduction state with each regular clock interval and is further caused to change in its conduction state at times intermediate to the regular clock intervals when there exists a coincidence between the existing output voltage of the flip-flop and the input voltage representing the next successive digit of the binary information. A logical circuit receives a first train of synchronizing pulses at regular clock times and a second train of pulses at times intermediate to the regular clock times. The first train of pulses are all passed to the flip-flop to reverse the conduction states thereof. The logical circuit passages pulses from the second train to the flip-flop only when there is a coincidence between the voltages at the input and at the output, which condition occurs when two or more like digits occur consecutively in the received data.

Other objects of the invention will be pointed out in the following description and claims and illustrated in the accompanying drawings which disclose, by way of example, the principle of the invention and the best mode which has been contemplated of applying that principle.

Figure 1:
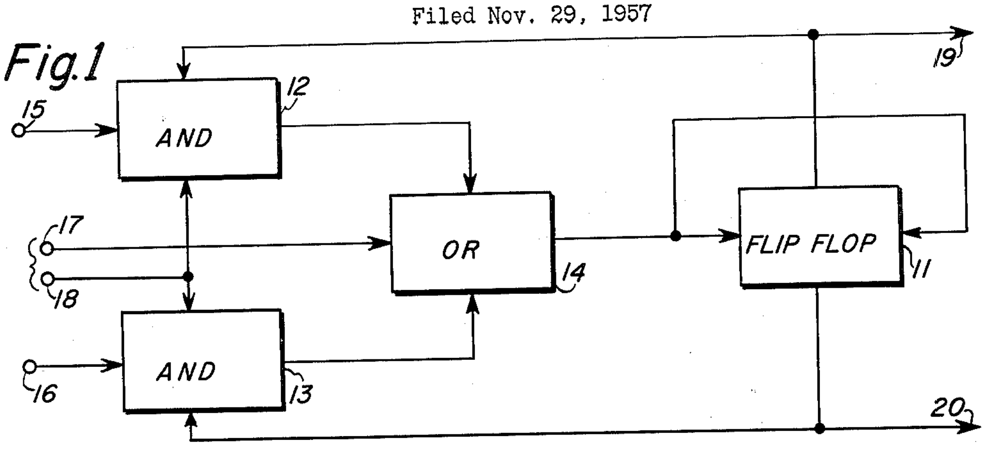
FIG. 1 is a simplified schematic diagram of the apparatus of this invention wherein the logical components are shown in blocks.

As shown in FIG. 1, the logical circuit for this invention comprises a flip-flop or bistable multivibrator 11, a pair of "AND" circuits 12 and 13, and an "OR" circuit 14. A first pair of input terminals 15 and 16 are adapted to receive the input waveform, and a second pair of terminals 17 and 18 are adapted to receive short duration timing pulses. An output signal is obtained from the plate circuits of the multivibrator 11 and are passed through output connections represented by the arrows 19 and 20 to further circuitry and apparatus which may include a magnetic storage device of a computer circuit.

The output wave may be taken from either or both of the connections 19 and 20 which are coupled to the plate circuit of the bistable multivibrator 11. The signals from the terminals 19 and 20 will be complementary to each other, i.e., at a time when the voltage at 19 is at a high level the corresponding voltage at the connection 20 will be at a low level and vice versa. Thus, the particular output terminal which may be used will depend upon whether it is desired to have the exact wave as shown at 29, FIG. 2, or whether it is desirable to have the mirror reflection of the wave 29. Likewise, the input wave impressed upon the terminals 15 and 16 may be generated from a multivibrator circuit (not shown), and therefore the wave 21 may be impressed directly upon the input terminal 15 while an exact opposite wave from a second plate of a multivibrator circuit may be impressed upon the terminal 16. On the other hand, if the wave 21 is the only such wave available, then by the use of an inverter circuit a complementary, or mirror reflection wave may be obtained for an input signal to the terminal 16. Thus, it may be appreciated that when an input signal is at a positive value on the terminal 15, then a corresponding input signal places a negative value on the input terminal 16 and vice versa.

Figure 2:
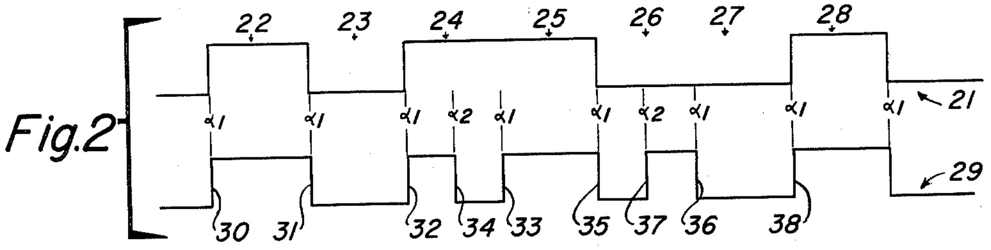
FIG. 2 is a graphical representation of the input and output voltage waves as received and transmitted by the apparatus of this invention.

The input wave impressed on the terminal 15 may be of the type shown by 21 of FIG. 2. In the art, this type of wave is known as a non-return-to-zero, NRZ, and consists simply of two voltage levels which are indicative of the two numbers "1" and "0" of the binary system. In the graphical representation of the wave 21 in FIG. 2, time is represented by the abscissa axis and the voltage by the ordinate axis. Time is measured incrementally in terms of timing pulses received by the terminals 17 and 18, FIG. 1. The pulses received at terminal 17 are regularly spaced in clock periods and are represented in FIG. 2 by $\alpha_1$. If the voltages of the wave 21 are chosen such that the more positive voltage is representative of a binary "1" and the more negative is representative of a binary "0," then it may be noted that the binary number represented in FIG. 2 commences with "1" since during the first clock interval 22 a positive voltage exists. The second number is "0" since a more negative voltage exists during the second clock interval 23. The next two numbers are both "1's" since the positive voltage is present for a duration of two clock intervals 24 and 25. The next two digits will be "0's" since the negative voltage exists through the next two clock intervals 26 and 27; and finally, another digit "1" appears since the voltage rises to a positive value during a final clock interval 28. It may therefore be appreciated that the binary number expressed in the voltage wave 21 is 1011001.

Also shown in FIG. 2 is a wave 29 which constitutes a modified NRZ signal or a "Ferranti" type signal. The wave 29 is similar to the wave 21 in that it varies between voltage levels. However, the value of the voltage or signal levels does no represent the digital information carried thereby, but rather, the changes in voltage at the times of the $\alpha_1$ clock pulses are indicative of the digital information. Thus, as we analyze the wave 29, we note that at a first clock time 30 there appears a sharp rise in voltage and this rise indicates a binary digit "1." At the next regular clock time 31 there is a sharp voltage drop which indicates a "0." During the next two regular clock times of the $\alpha_1$ pulse, the wave 29 rises sharply, and therefore the next two digits are "1's." To make it possible for the wave to rise sharply at two consecutive clock intervals of $\alpha_1$, it is necessary that the wave drop from the positive value to a negative value at some time which is intermediate to the $\alpha_1$ pulses. As may be seen in FIG. 2, an $\alpha_2$ pulse is interjected at a time 34 between the regular clock intervals to drop the voltage to the lower level thus making it possible for the voltage to rise at the next regular clock interval 33. During the next two consecutive clock times established by $\alpha_1$ pulses 35 and 36, the wave 29 drops to the lower value of voltage, and therefore two "0's" are indicated. It is necessary to interject a rise in voltage at an intermediate time 37 established by an $\alpha_2$ pulse to permit the wave 29 to fall in voltage during both of the two consecutive regular clock times 35 and 36. The final digit with which we are concerned is a "1" represented by a rise in voltage at a clock time of 38. Thus, it may be appreciated that the Ferranti wave 29 carries the same information as the NRZ wave 21; namely, the binary number 1011001.

The wave 29 is generated by the plate circuit of the flip-flop or bistable multivibrator 11, and it may be further noted that the wave shifts from a negative value to a positive value and vice versa with each regular timing pulse $\alpha_1$ as received at the terminal 17. As shown in FIG. 1, the terminal 17 is connected to the OR circuit 14 and thence is coupled to the flip-flop circuit 11. Since an OR circuit will pass all signals which it receives, it becomes apparent that all of the regular clock pulses $\alpha_1$ received at the terminals 17 will be passed to the flip-flop circuit 11 and will cause the conduction state thereof to be reversed, thereby causing a change in the voltage levels as seen in wave 29 of FIG. 2.

From a study of FIG. 2, it becomes apparent that when the input wave received at terminals 15 and 16 represent alternate "1's" and "0's," then it is only necessary for the flip-flop 11 to change its conduction state at the regular clock time of the $\alpha_1$ pulses. However, if the digital information contains consecutive "1's" or consecutive "0's," then it is necessary that an $\alpha_2$ pulse be introduced to change the conduction state of the flip-flop at a time which is intermediate to the regular clock intervals. When the transmitted data contains two consecutive "1's," the voltage at the output terminal 19 will have risen to a positive value indicating the first "1" while a similar positive voltage will appear at the input terminal 15 indicating the second "1." Similarly, when two consecutive "0's" occur, the voltage at both the output terminal 19 and the input terminal 15 will go negative at the same time, whereupon the complementary terminals 20 and 16 will both go positive.

The circuit of FIG. 1 accomplishes the function of receiving a train of $\alpha_2$ pulses at terminal 18 and of impressing the $\alpha_2$ pulses upon both of the AND gates 12 and 13. The AND gates will pass the $\alpha_2$ pulses only when there is a coincidence between the voltage level of the input and of the output circuits at a time when the $\alpha_2$ pulses appear. Thus, for example, if the flip-flop is in a state of conduction such that the connection 19 is at a positive value, and if a further voltage having a positive value is impressed at the input terminal 15, then there will be a coincidence of positive inputs to the AND circuit 12. Likewise, in this same example, the output voltage at 20 is negative while the next succeeding input voltage at 16 is also negative. Thus, there is a coincidence in the negative voltages impressed upon the AND circuit 13. With this coincidence existing, an $\alpha_2$ pulse from the terminal 18 will be passed through either the AND circuit 12 or the AND circuit 13, and thence through the OR circuit 14, and to the flip-flop 11 to effect a reversal of the conduction state thereof. Since the circuit of FIG. 1 has been provided with two AND circuits 12 and 13, it matters not if the coincidence is caused by the binary information having consecutive "1's" or consecutive "0's." In any event, the flip-flop will be reversed at a time intermediate to the regular clock times.

Figure 3:
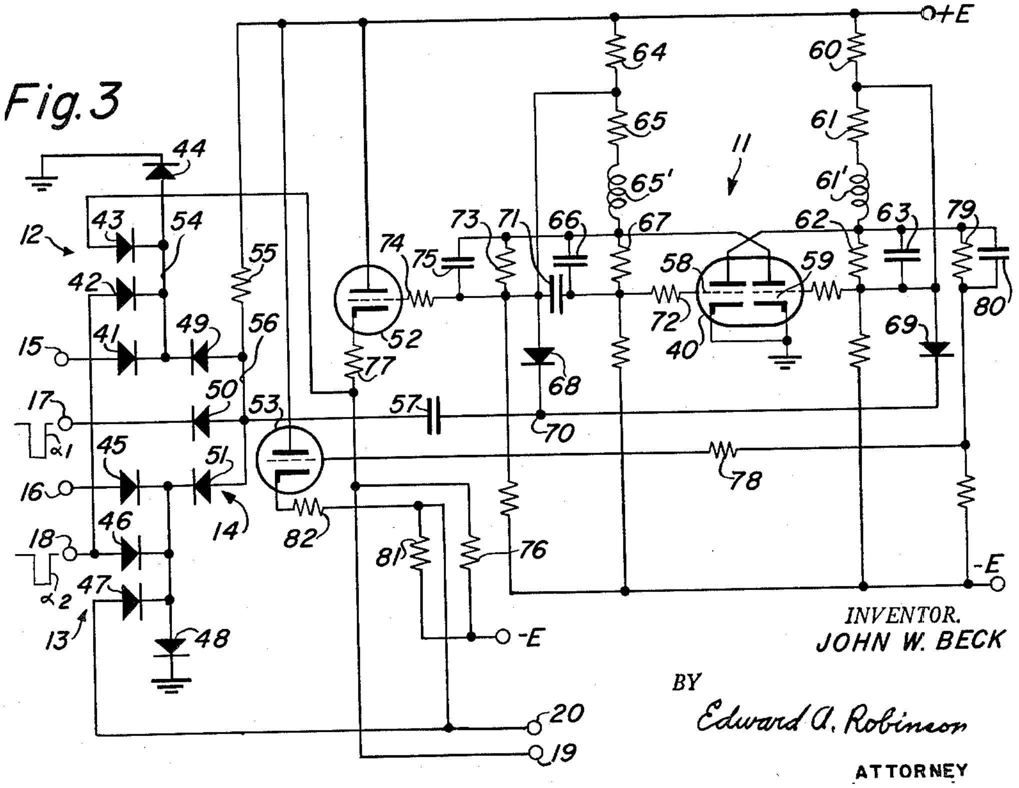
FIG. 3 is a detailed circuit diagram of the apparatus.

While FIG. 1 shows in block form the logical components for carrying out the teachings of this invention, FIG. 3 shows a detailed circuit arrangement for performing the logic as in FIG. 1. The principal components shown in FIG. 3 are a double triode electron tube 40 constituting the flip-flop or bistable multivibrator 11, the first AND circuit 12 including four germanium diodes or other rectifying devices 41 through 44, the second "AND" circuit including four other diodes 45 through 48, the "OR" circuit 14 including the three diodes 49 through 51, and a pair of electron tubes 52 and 53 connected as cathode followers to provide well regulated output voltages.

The diodes 41 through 44 of the AND circuit 12 are connected to a common point 54. The diode 44 functions as a clamp to prevent the voltage of the point 54 from rising higher than a reference ground potential. The diodes 41 through 43 function to pass currents tending to drive the point 54 positive when any positive voltage appears at the terminals 15, 18 or 19 connected therewith. The voltage of the point 54 is therefore always maintained at ground potential unless all three of the diodes 41, 42 and 43 become non-conducting due to negative voltages at their respective terminals whereupon a negative voltage will appear at the point 54. Since all three of the terminals 15, 18 and 19 must go negative before the common point 54 will likewise become negative, it will be appreciated that this combination of diodes 41 through 44 constitutes a negative AND circuit. Similarly, the diodes 45 through 48 constitute the other negative "AND" circuit 13 which functions in the same manner as does the AND circuit 12.

The diodes 49 through 51 together with the resistor 55 constitute the OR circuit 14. A voltage at a common point 56 will remain substantially positive until a negative voltage is impressed upon any one of the three diodes 49 through 51 whereupon that respective diode will conduct and cause the voltage at 56 to drop negative.

A negative pulse passed by any one of the three diodes 49 through 51 will be further passed by a coupling condenser 57 to reverse the conduction state of the trigger or flip-flop circuit 11. To understand the operation of the flip-flop circuit 11, it may be assumed in an initial state the left-hand triode 58 of the electron tube 40 is conducting while a right-hand triode 59 is in a state of non-conduction. With the triode 58 conducting, its plate voltage will become reduced since a substantial voltage drop will appear across resistors 60 and 61 and a peaking coil 61'. The anode or plate of the triode 58 is coupled to the grid of the triode 59 by a resistor 62 and a condenser 63, and therefore the grid of the triode 59 is held at a low potential value preventing conduction in the triode 59. Since the triode 59 is non-conducting, the anode thereof is at a high voltage which will approach that of the terminal +E since there will be a very slight voltage drop across load resistors 64 and 65 and a peaking coil 65'. The anode of the triode 59 is coupled to the grid of the triode 58 by a condenser 66 and a resistor 67; and since the anode of the triode 59 is at a high voltage during non-conduction thereof, the grid of the triode 58 likewise assumes a substantial positive voltage thereby driving that triode 58 into heavy conduction.

A pair of diodes 68 and 69 are provided to couple the grids of the double triode 40 to the input circuit including the coupling capacitor 57. When the flip-flop circuit 11 is in its initial state of conduction with the triode 58 conductive and the triode 59 non-conductive, the anode of the triode 59 will assume a higher voltage than that of the triode 58 and the diode 68 will then conduct to raise the point 70 in the input circuit to the higher potential level while the diode 69 cuts off and isolates the grid of the triode 59 from the input condenser 57. Thence, when a voltage pulse $\alpha_1$ or $\alpha_2$ is passed by the condenser 57, that negative voltage pulse is further passed by the diode 68, a further coupling condenser 71 and a resistor 72 to drive the grid of the triode 58 negative. Because its grid is driven negative, the triode 58 ceases to conduct, thus raising the voltage of its plate which is in turn coupled to the grid of the triode 59 causing conduction thereof. Thus, it is seen that the negative pulse passed by the coupling condenser 57 causes a reversal in the conduction state of the bistable multivibrator 11. With the conduction state reversed, the anode voltages are likewise reversed and the diode 69 becomes conductive while the diode 68 becomes non-conductive. Thus, the circuit is made ready for the next negative pulse which may be passed by the coupling condenser 57 to again reverse the conduction state of the multivibrator 11.

The output voltages which are to appear at the terminals 19 and 20 must be held within a standard level for use in subsequent circuitry of the computer. A first cathode follower 52 is coupled to the plate of the triode 59 by the resistances 73 and 74 and by the capacitance 75. The output connected terminal 19 is connected between the cathode resistors 76 and 77 as is the feedback connection to the diode 43 of the AND circuit 12. Similarly, the cathode follower 53 is coupled to the anode of the triode 58 by resistors 78 and 79 and the condenser 80, and the output terminal 20 is connected between the cathode resistors 81 and 82 together with a feedback connection to the diode 47 of the AND circuit 13. The positive output voltage from the cathode follower tubes is thus determined by the ratio of cathode resistors 76 and 77 of the cathode follower tube 52 and by the ratio of the resistors 81 and 82 of the cathode follower 53. Since the electron tubes 52 and 53 are cathode followers, the subsequent computer circuitry will be essentially isolated from and will not affect the operation of the flip-flop circuit 11.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for receiving digital information in the form of input voltage levels and for transmitting the digital information in the form of timed changes in output voltage levels, said apparatus comprising a multivibrator having two stable states of conduction and having two output terminals for passing the output voltage levels, two AND gates each coupled to receive output voltages from one of the output terminals and further coupled to receive input voltages, a means for receiving and passing a first train of timed pulses to the multivibrator independently of said AND gates for reversing the conduction states of said multivibrator, and a means for receiving and passing a second train of pulses to both of the AND gates, each of said AND gates being operable to pass pulses to the multivibrator to reverse the conduction state thereof when both the input voltage and the output voltage are of a predetermined polarity.

2. The apparatus according to claim 1 wherein said means to receive and pass all of the pulses of the first train is an OR circuit which is also coupled to each of the AND gates to pass pulses therefrom, said OR circuit being coupled to the multivibrator whereby all of the pulses of the first train and the pulses of the second train which occur during a coincidence of input and output voltage levels will cause reversals of the conduction states of the multivibrator.

References Cited in the file of this patent

UNITED STATES PATENTS

| | | |
|---|---|---|
| 2,807,003 | Alrich | Sept. 17, 1957 |
| 2,850,726 | Steele | Sept. 2, 1958 |